United States Patent [19]

Griffin et al.

[11] Patent Number: 5,716,260
[45] Date of Patent: Feb. 10, 1998

[54] APPARATUS AND METHOD FOR CLEANING AND RESTORING FLOOR SURFACES

[75] Inventors: Ellis L. Griffin, May, Tex.; Terry J. Klos, Victoria, Minn.; John J. Rolando; Arthur F. Luedtke, both of Woodbury, Minn.; Paulette D. Stolte, Maplewood, Minn.

[73] Assignee: Ecolab Inc., St. Paul, Minn.

[21] Appl. No.: 382,906

[22] Filed: Feb. 3, 1995

[51] Int. Cl.$^6$ ............................................. B24C 9/00
[52] U.S. Cl. ............................. 451/87; 451/88; 451/92; 451/350
[58] Field of Search ....................... 451/87, 88, 92, 451/350

[56] References Cited

U.S. PATENT DOCUMENTS

| | | | |
|---|---|---|---|
| 2,770,924 | 11/1956 | Mead et al. | 51/8 |
| 3,769,753 | 11/1973 | Fleischer | 451/87 |
| 3,847,688 | 11/1974 | Gillice | 156/2 |
| 3,925,935 | 12/1975 | Ricklefs | 51/8 HD |
| 4,025,419 | 5/1977 | Musschoot | 451/88 |
| 4,064,662 | 12/1977 | Maeda | 451/87 |
| 4,295,274 | 10/1981 | Bricher et al. | 30/347 |
| 4,470,226 | 9/1984 | Williams | 451/92 |
| 4,592,108 | 6/1986 | Svendsen | 15/4 |
| 4,671,022 | 6/1987 | Williams | 51/410 |
| 4,731,959 | 3/1988 | Musschoot | 451/88 |
| 4,768,311 | 9/1988 | Olson | 51/174 |
| 4,773,189 | 9/1988 | Macmillan et al. | 451/88 |
| 4,822,431 | 4/1989 | Bricher et al. | 134/28 |
| 4,827,678 | 5/1989 | Macmillan et al. | 451/88 |
| 4,993,200 | 2/1991 | Morioka et al. | 451/88 |
| 5,054,245 | 10/1991 | Coty | 51/170 R |
| 5,071,541 | 12/1991 | Thompson | 451/88 |
| 5,107,630 | 4/1992 | Lodewijk | 451/88 |
| 5,231,805 | 8/1993 | Sander | 451/88 |
| 5,257,479 | 11/1993 | Swain | 451/88 |
| 5,261,192 | 11/1993 | Nelson | 451/88 |
| 5,291,697 | 3/1994 | Nelson | 451/88 |
| 5,319,893 | 6/1994 | Hockett | 451/87 |
| 5,468,174 | 11/1995 | Bachand et al. | 451/92 |
| 5,489,234 | 2/1996 | Hockett | 451/88 |

FOREIGN PATENT DOCUMENTS

| | | |
|---|---|---|
| 0 349 490 | 1/1990 | European Pat. Off. |
| 0 416 711 A1 | 3/1991 | European Pat. Off. |
| A 617 161 | 2/1949 | United Kingdom |
| 2 193 454 | 2/1988 | United Kingdom |
| 89/07484 | 8/1989 | WIPO |
| 92/07889 | 5/1992 | WIPO |
| 92/17317 | 10/1992 | WIPO |

OTHER PUBLICATIONS

Ellis L. Griffin; Affidavit Regarding Public Use; Mar. 3, 1995; pp. 1–3.

Economics in Technology/Carroll Company; "Ultra–Traxion" promotional flyer and label; undated.

American Marazzi Tile; "Technical Information"; undated; pp. 2 and 3.

Welding and Metal Fabrication, 20 (1952.10), 10, 362, Vacu–Blasting.

*Primary Examiner*—James G. Smith
*Assistant Examiner*—Dona C. Edwards
*Attorney, Agent, or Firm*—Merchant, Gould, Smith, Edell, Welter & Schmidt, P.A.

[57] ABSTRACT

A cleaning and restoration system 10 for floors 11 and other hard surfaces is disclosed. The system 10 has an cleaning head 12 which can be moved across a floor 11 or other hard surface. The cleaning head 12 impinges particulate media upon the floor 11 to remove soils and provide a slip-resistant surface. The media is entrained into the air by a pressure tank 18. The media is reclaimed in a classifier 17; and the dust, soils, and other undesirable materials are filtered in a dust collector 57. A compressor 20 and a vacuum blower 22, and other components of the system are mounted on a truck 19. A method for utilizing the restoration system 10 is also disclosed.

13 Claims, 6 Drawing Sheets

APPARATUS AND METHOD FOR CLEANING AND RESTORING FLOOR SURFACES

FIELD OF THE INVENTION

This invention relates generally to systems for cleaning and restoring hard surfaces such as floors. The invention is particularly useful on quarry tile floors for the maintenance of a clean and slip-resistant surface.

BACKGROUND OF THE INVENTION

Extruded clay or ceramic tile, sometimes called quarry tile, is used in restaurant kitchens. Quarry tile is popular in restaurants and other kitchen areas because it is relatively inexpensive, durable, and has relatively low porosity. Quarry tile is made from natural clays with the composition being approximately 50% hard particles (silicon) and the other 50% soft particles (clay components). When the clay tile is fired it develops a pervious glaze-like coating which encapsulates pores under the surface. Because of the pervious nature of the surface, these pores collect and entrap various soils that are extremely difficult to clean thoroughly.

The surface of the tile is subject to wear, polishing and soil build-up which can result in a slippery floor condition. Slippery floors result in accidents and injuries from slipping and falling. These accidents can cause a serious injury to the restaurant worker, and they result in significant costs for the restaurant owner.

One of every twenty workplace injuries in the United States occurs in a restaurant. The U.S. Food Service Industry spends approximately four hundred million dollars per year on slips and falls. Approximately half of that amount is spent on re-training and time lost, and the other half is spent on medical, worker's compensation, and overtime expenses. Many other accidents occur in hotels, homes, places of business, hospitals, and around swimming pools, due to slipping on wet surfaces of ceramic tile, glazed porcelain and smooth concrete.

During the manufacturing process of quarry tile, a natural surface roughness is created consisting of hard, microscopic peaks of silica and inert clays. The surface texture or roughness coupled with the surface porosity provides the tile with an optimum static coefficient of friction (traction). New quarry tile tends to be slip-resistant, and some tiles feature anti-slip properties such as added grit, grid patterns or a rougher surface texture. However, even the anti-slip tiles become worn and soiled over time, and become slippery and potentially dangerous. After a short time, the quarry tile receives abrasion and surface wear due to foot traffic, soils and daily surface cleaning. The original hard microscopic peaks become polished or worn down, leading to flat surface areas. These worn areas result in a lower static coefficient of friction and create a potentially slippery floor surface. In addition, frying, grilling and sauteing create airborne grease, which causes a potentially hazardous film to develop on kitchen floors. The grease gets carried by shoes to other parts of the restaurant. This layer of grease can be enough to cause an accident. If poorly cleaned, a quarry tile floor can become saturated with grease, and continue to stay slippery despite routine cleaning.

To address this slipperiness problem, several techniques have been utilized. One technique is the application of an acid etchant to the surface of the floor. An example of this process is the Gillice patent, U.S. Pat. No. 3,847,688. The acid etch system works by dissolving silicon and creating microscopic pores in the tile. While the acid etchant reduces floor slipperiness on a temporary basis, it is not effective over the long-term. After use of the acid etch technique, the microscopic pores become filled with grease and other types of soil, thereby resulting in a slippery floor condition. Additionally, the acid etch processes destroy the hard components of the clay tiles (the silicon), leaving softer components of the floor at the surface. These softer components are easily worn away, which can result in a worn and/or uneven floor surface. In effect, the acid etch technique destroys the tile. In addition, the acid poses a potential safety hazard if it is not utilized properly. For a variety of reasons, some manufacturers of tile do not recommend the use of any acid cleaning on their ceramic tile products.

Other solutions to the slipperiness problem have been to lay non-slip mats upon the floor, and to apply abrasive strips to the floor. However, these mats and strips become worn rather quickly, and they hinder the daily routine cleaning of the floor. The mats sometimes come loose and slide, and they significantly alter the appearance of the floor surface. It is also is difficult to clean and sanitize the mats.

Another attempt at solving the slipperiness problem is a diamond etch technique. With the diamond etch system, a diamond cutter may be utilized to create concentric circles in the floor. The circles are approximately ⅛ to ¼ inch in depth, which unfortunately provides space for soil buildup. These circles, along with the tile's grout areas, are especially difficult to clean. It is also possible to apply a slip resistant coating to floors. These coatings can be difficult to apply, and soil can adhere to the coating.

Although sandblasting systems are known in the prior art, the typical sandblasting systems can ruin some floors and produce too much dust for indoor use. For example, the Ricklefs patent (U.S. Pat. No. 3,925,935) discloses a system for abrading the surface of a porcelain bathtub to render it slip resistant. With this system, the bottom of the tub is covered with a stencil, a cover is draped over the tub, and a stream of abrasive granules is applied to the bottom of the tub at the stencil. However, there is no teaching or disclosure in the Ricklefs patent regarding the utilization of a system for cleaning and restoring floor surfaces.

The present invention addresses the above problems associated with currently available cleaning techniques.

SUMMARY OF THE INVENTION

The invention is a closed mechanical system for moving a fluidized stream of particles through a carrying medium (air, for example) onto the target surface. The stream of particles impacts the hard surface, and provides a cleaning and restoration action as soils and surface materials are physically removed by the impact. The particles are instantly vacuumed and recovered from the point of impact.

The system for cleaning and restoring the slip resistance of a floor comprises several elements: a compressor for supplying an air stream through an air supply conduit; moisture reduction means for removing excess moisture from the air stream; adjustable aspirator means for entraining pressurized particulate media into the air stream; a cleaning unit for impinging the particulates upon the floor for removal of soils and surface particles; a vacuum blower which evacuates soils and surface particles from the floor; a classifier for separating the reusable particulate media from the soils; and a dust collector for filtering and collecting the soils for disposal. In the preferred embodiment, the system has a means for automatically transferring the reclaimed particulate media from the classifier and into a pressure tank for re-use.

Another aspect of the invention is a machine for cleaning and restoring a floor. The machine comprises a portable support frame; a nozzle having a longitudinal bore which terminates proximate the floor; an annular brush which is in contact with the floor; and an exhaust chamber for evacuating soils and surface materials from the floor.

Yet another aspect of the invention is a method for cleaning and restoring a hard surface. This method includes the steps of: positioning a vehicle proximate the site of the hard surface to be restored, with the vehicle containing a compressor, a vacuum blower, a pressure tank containing particulate media, and a dust collector; actuating the vehicle's power takeoff shaft so as to power the vacuum blower and the compressor; entraining the particulate media into the air stream; and passing the cleaning head over the surface to be treated. The inventive method also includes the steps of adjusting the amount of particulate media which impinges the surface to be treated, adjusting the pressure at which the media is applied, and adjusting the amount of particulate media which is designated for re-use.

A final aspect of the present invention is a tile floor surface which has been treated with the restoration system of the present invention. The tile floor surface has a certain preferred chemical composition, and a preferred coefficient of friction.

A primary advantage of the present invention is that it restores tile to a condition that is equal to or better than new tile, as measured by the coefficient of friction. By increasing the coefficient of friction (i.e. traction) and reducing floor slipperiness, dangerous and costly accidents can be avoided. The present invention results in a relatively non-slippery floor surface, even when the floor becomes soiled or wet. The slip resistance is achieved primarily by the mechanical removal of more of the softer components of the tile, while leaving a substantial amount of the hard components of the tile in place. This type of mechanical action preserves the overall integrity of the tile, unlike acid etch treatments.

Another advantage of the present invention is that it provides a deep and thorough cleaning of the floor tile. Despite daily cleansing of the floor, there is often a buildup of soil and grease over time. The present invention effectively impacts, loosens, and removes the soil buildup, thereby resulting in a sanitary, attractive floor surface.

Yet another advantage of the present invention is that it may utilized on a wide variety of surfaces, and it may be utilized either indoors or outdoors. For example, the present invention may be utilized on concrete (pool decks, buildings, roadways, walkways, etc.); stainless steel (hood and ducts, etc.); asphalt (driveways, roads, etc.); and other surfaces and applications. Because the invention incorporates a closed mechanical system in which the fluidized stream of particles is contained, the invention may be utilized both indoors and outdoors.

A further advantage of the present invention is that the floor maintains its slip resistance over the long term, assuming that normal floor maintenance is performed. Specifically, a tile floor can maintain its slip resistance for one to three years after use of the present invention. After treatment of the floor with the present invention, routine cleaning with a deck brush is more effective at removing grease and other soils. The restoration system can also decrease the drying time of the floor surface by restoring its natural porosity.

The present invention is also advantageous because it is relatively easy to use. The equipment is relatively compact, lightweight and portable, so that it can be easily moved from location to location. All components of the system can be mounted on a truck, trailer or other portable vehicle; or the system can be maintained as a permanent installation near the desired place of use. The machine's cleaning head covers a relatively wide path, and the treatment can be applied uniformly over the floor's surface. Additionally, the present invention effectively filters dust through use of a unique filtering and vacuum system. The design of the present invention provides for the effective flow of the media without problems due to clogging and excess moisture.

Another advantage of the present invention is that the optimum media can be selected for use, depending upon the type of floor surface, the type of soil, the amount of cleaning and/or traction to be achieved, and other particular conditions of the situation. Additionally, the proper particle size, pressure and flow rate of the media may be selected and adjusted to achieve the best results.

For a better understanding of the invention and the advantages obtained by its use, reference should be made to the drawings and the accompanying descriptive matter, in which there is illustrated and described a preferred embodiment of the invention.

DETAILED DESCRIPTION OF THE PREFERRED EMBODIMENT

Figures 1, 1A:
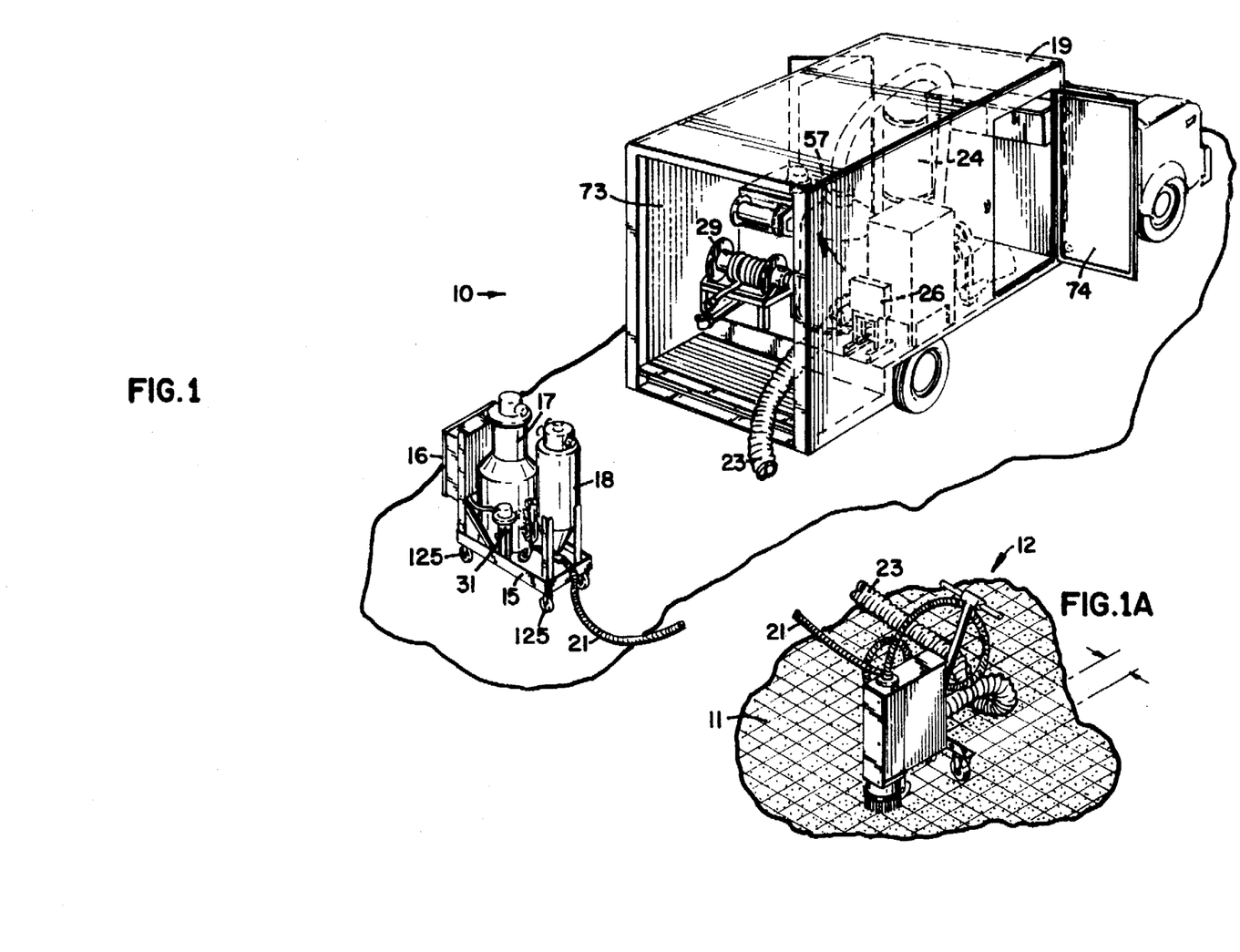
FIG. 1 is a perspective view of a portion of the floor restoration system of the present invention.
FIG. 1A is a perspective view of the system's cleaning head.

FIG. 1 illustrates the cleaning and restoration system 10 of the present invention. The system 10 includes a cleaning head 12 which is movable across the surface 11 to be treated. The system 10 includes a portable cart 15 upon which is mounted a control panel 16, a classifier 17, and a pressure tank 18. The control panel 16 permits the operator to control various features of the system 10.

Figure 4:
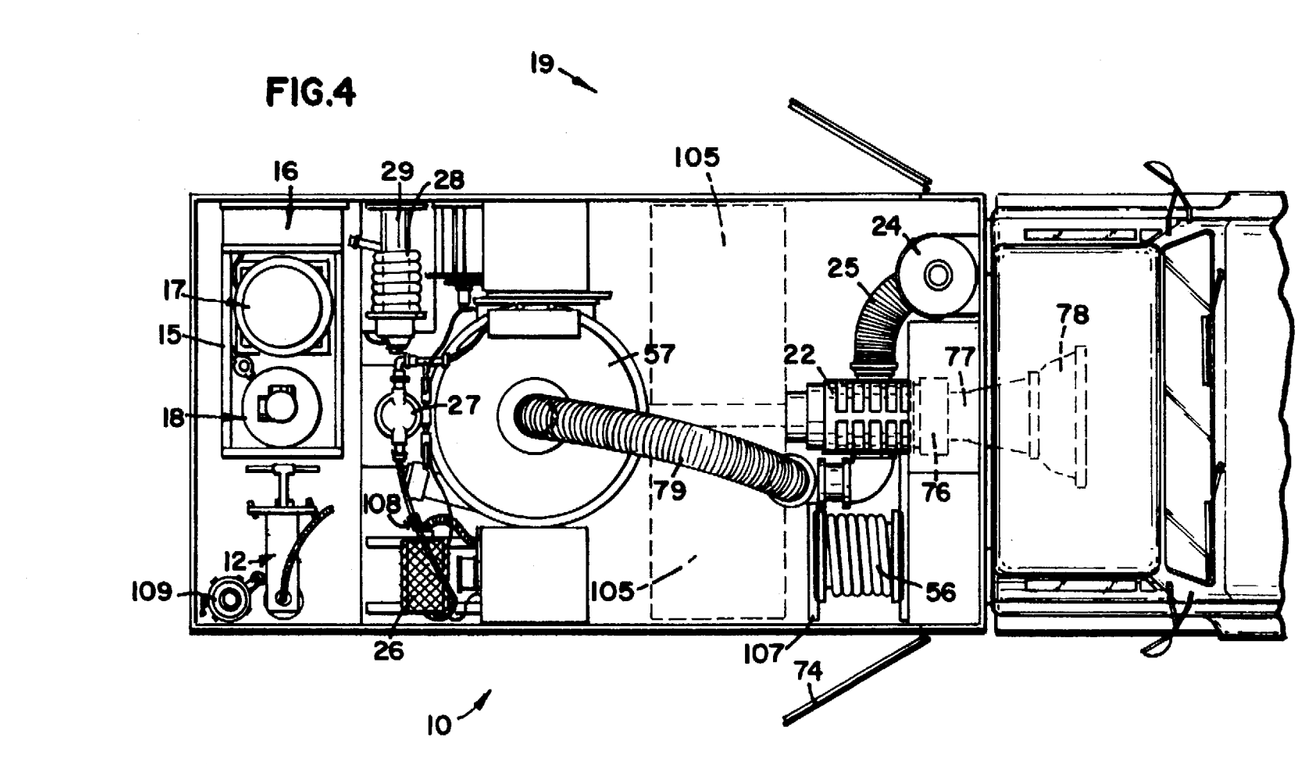
FIG. 4 is a top plan, schematic view of the components of the system as mounted on the truck bed.

The system 10 is designed so that all of its components can be mounted within a truck 19 or other type of vehicle for portability. Alternatively, the system components may be stationary, so that the surfaces to be treated (e.g. pots or storage tanks) would be brought to the site of the restoration apparatus. FIG. 1 shows the cleaning head 12 and cart 15 removed from the truck 19, whereas FIG. 4 illustrates these components within the truck's bed. The truck bed has a rear door 73 and a side door 74 for access to various components of the system.

The cleaning head 12 impinges a high-velocity fluidized stream of abrasive particles against the surface 11 to be abraded. Compressed air is provided by a compressor 20 mounted upon the truck 19. (The compressor 20 is shown on FIG. 2 but cannot be viewed in FIG. 4, because it is positioned beneath the vacuum blower 22). The compressor 20 may be mounted on the vehicle 19, and preferably the air compressor 20 is mounted on and driven by the truck's power take-off shaft. Otherwise, the compressed air may be provided by a compressor at the work site. For example, some hotels have an internal supply of compressed air for their laundry facilities. The pressurized air imparts momentum to the abrasive particles entrained therein. The compressed air is delivered to the cleaning head 12 via a series of air conduits 28, 34, 42 and a media hose 21.

A vacuum blower 22 is mounted on the truck bed 19. The blower is of the positive displacement type. The vacuum blower 22 is in fluid communication with the cleaning head 12 by means of an exhaust hoses 23, 56 and 79. The vacuum blower is associated with a muffler 24 for noise reduction purposes. The vacuum blower 22 facilitates withdrawal and recovery of the spent abrasive particles and the withdrawal and collection of dust, soil and floor particles. The exhaust hoses 23, 56 and 79 are flexible hoses of approximately four inches in diameter. The vacuum blower 22 is interconnected via a conduit 25 to a muffler 24 for noise reduction purposes.

Figure 2:
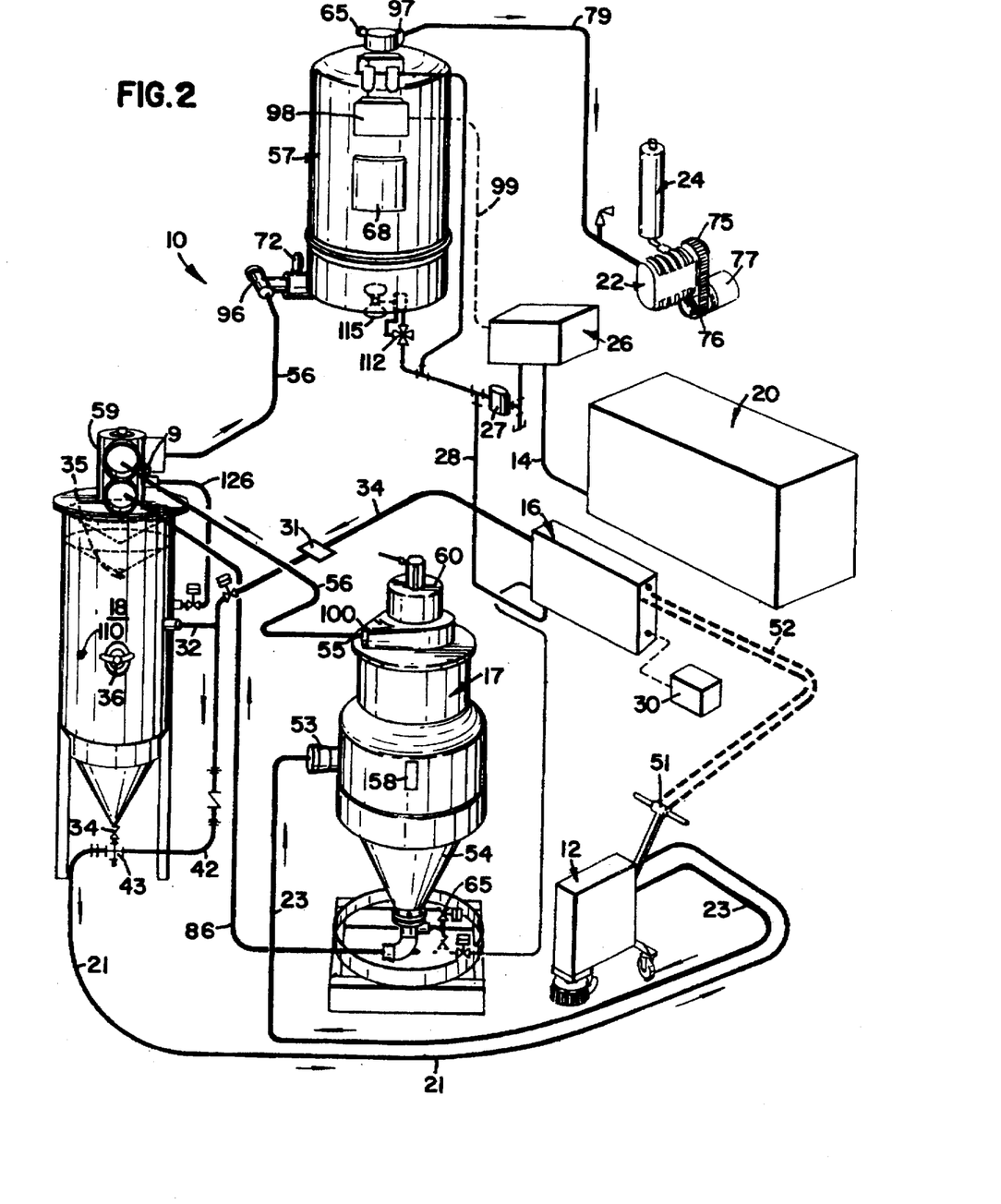
FIG. 2 is a schematic view of the system's flow lines.

FIG. 2 schematically illustrates the various components of the system 10. The compressor 20 is preferably mounted beneath the truck's bed; however, the compressor 20 could be mounted at other locations on the truck or could be entirely separate from the truck. The compressor 20 is a source of compressed air, which develops approximately 125 psig air.

The air is delivered through conduit 14 from the compressor 20 to an aftercooler 26 which is preferably mounted upon the truck. The aftercooler 26 serves to reduce the temperature of the air from about 180° F. (the temperature of the air as it leaves the compressor) to about 110° F. This temperature change reduces the ability of the air to retain moisture. Downstream from the aftercooler 26 is a main pressure ball valve (not shown). The air then passes through a water separator 27, which removes moisture from the compressed air. A hose (not shown) extends below the water separator 27 to the ground beneath the truck 19 to allow drainage of water from the water separator 27. The dry air helps to maintain the fineness and separation of the abrasive particles in the fluid stream.

An air conduit 28 is wound on a reel 29 in the truck 19. The conduit 28 is approximately one inch in diameter. The conduit 28 extends between the water separator 27 and the control panel 16. The conduit 28 is any suitable length which will accommodate the distance between the truck 19 and cart 15 which holds the control panel 16, classifier 17 and pressure tank 18. The cart 15 has wheels 125 which permit portability to the site of use. The control panel 16 has a pressure regulator (not shown) for displaying and controlling the air pressure. The air is maintained at a pressure of approximately 20–80 psi, preferably 50–60 psi. The control panel 16 is powered by a twelve volt battery 30, or a 110 volt battery equipped with a transformer. After the control panel, the air passes through a coalescing filter 31 which removes molecules of oil and water from the compressed air. The coalescing filter 31 has a release valve (not shown) which allows moisture to escape.

The air then passes through another one inch air conduit 42 to a media metering value 43 at the bottom of the pressure tank 18. A pressure equalizer inlet 32 ensures that an equal pressure is maintained between the pressure in the conduit 32 and the pressure in the tank 18. The pressure line 32 enters at the middle portion of the pressure tank's side wall. Because of the inlet 32, the pressure tank's chamber 33 becomes pressurized, so that the particulate media drops by gravity to the bottom of the pressure tank's hopper 33.

The particulate media is stored in the chamber 33 of the pressure tank 18 until it is used. The pressure tank 18 is periodically replenished by a unique automatic transfer process described below. There is a check valve 35 within the pressure tank 18 to prevent the backflow of the abrasive particles into the upper portion of the pressure tank. The plunger valve 35 is closed during normal operation. That is, the plunger 130 is in its up position, such that the plunger head 82 abuts against the valve seat 95. (FIG. 2 illustrates the valve 35 in its open position, with the plunger 130 being lowered). During normal operation, the media descends by gravity within the pressure tank 18 and is entrained into the air stream by a media metering valve 43.

The media metering valve 43 has an inlet port connected to the conduit 42 and an outlet port connected to the conduit 21. A media metering valve 43 controls the amount of media which enters the air stream. Preferably, the media metering valve 43 is a needle valve. The valve 43 has a knob (not shown) which is manually rotated by the operator to adjust the amount of media entrained depending upon the particular situation.

Figure 5:
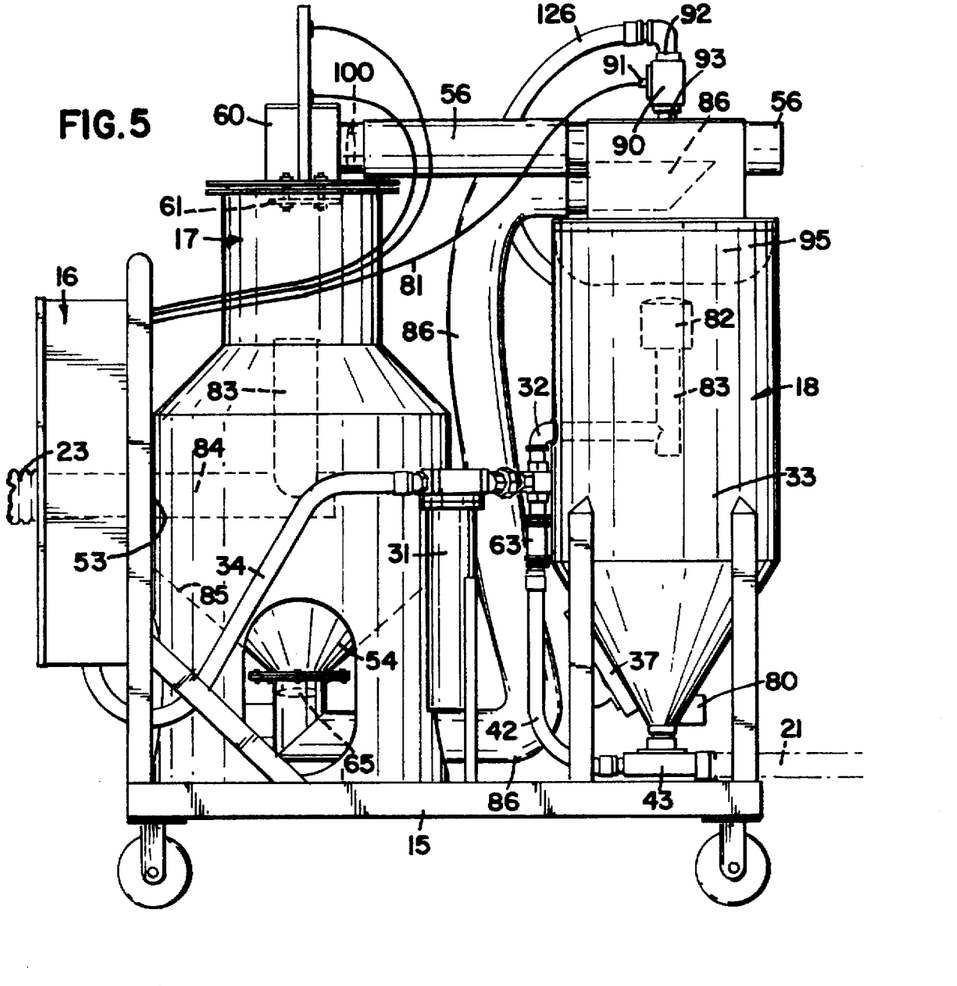
FIG. 5 is a side elevational, schematic view of the control panel, classifier and pressure tank of the floor restoration system.

As shown in FIG. 5, a vibrator 37 is connected to the pressure tank 18 to vibrate the pressure tank 18. The vibrator 37 is preferably mounted on the outer wall of the pressure tank 18, near its lower portion where the media collects. The vibrator 37 prevents clogging and facilitates the flow of the media. The pressure tank 18 has an access door and short pipe 80 proximate the bottom of the pressure tank 18, for the purpose of cleaning the pressure tank 18 when necessary.

In the preferred embodiment, the initial charge of media in the pressure tank 18 is approximately 300 pounds. Depending upon the size of the area 11 to be cleaned, additional media may need to be added to the pressure tank 18 during the cleaning operation in order to compensate for the media that is not recycled and recovered. Before the media is added to the pressure tank 18, it is stored in a pair of tanks 105 on the truck's bed. The pressure tank 18 has a glass sight plug 110 which enables the operator to observe the media within the pressure tank 18. Preferably, the plug 110 is removably threaded into the pressure tank's wall. When it is necessary to add media to the pressure tank 18, the glass sight plug 110 is unscrewed, and a threaded funnel (not shown) is inserted into the aperture. After the tank 18 has been filled, the glass sight plug 110 is replaced.

At the top of the pressure tank 18 is a transfer valve 90, which is closed during normal operation. A pressure gauge 9 may also be provided near the top of the pressure tank, in order to monitor the system's performance. The transfer valve 90 has two inlet ports 91, 92 and a outlet port 93. The first inlet port 92 receives an air line 126 which extends from the middle of the pressure tank 18. Preferably, the air line 126 is approximately one inch in diameter.

A media hose 21 extends between the pressure tank 18 and the cleaning head 12. The cleaning head 12 is illustrated in detail in FIG. 3. The cleaning head 12 has a set of swivel wheels 37 to facilitate maneuverability. The cleaning head 12 is adapted to move in either the forward or backward direction. A support frame 38 carries the elements of the cleaning head 12. The frame 38 has a handle member 39, the upper end of which is not illustrated in FIG. 3 but which is shown in FIG. 2. In the preferred embodiment, the handle 39 has a height adjustment mechanism 40. At its bottom end, the cleaning head 12 has an annular floor brush 41. Preferably, the floor brush 41 is approximately six inches in diameter, so the cleaning head 12 makes approximately a three inch wide pass depending on media size and pressure. The annular brush 41 makes firm contact with the floor 11 to be abraded, and the brush 41 confines the spent particles and facilitates evacuation of the particles from the floor 11.

Figure 3:
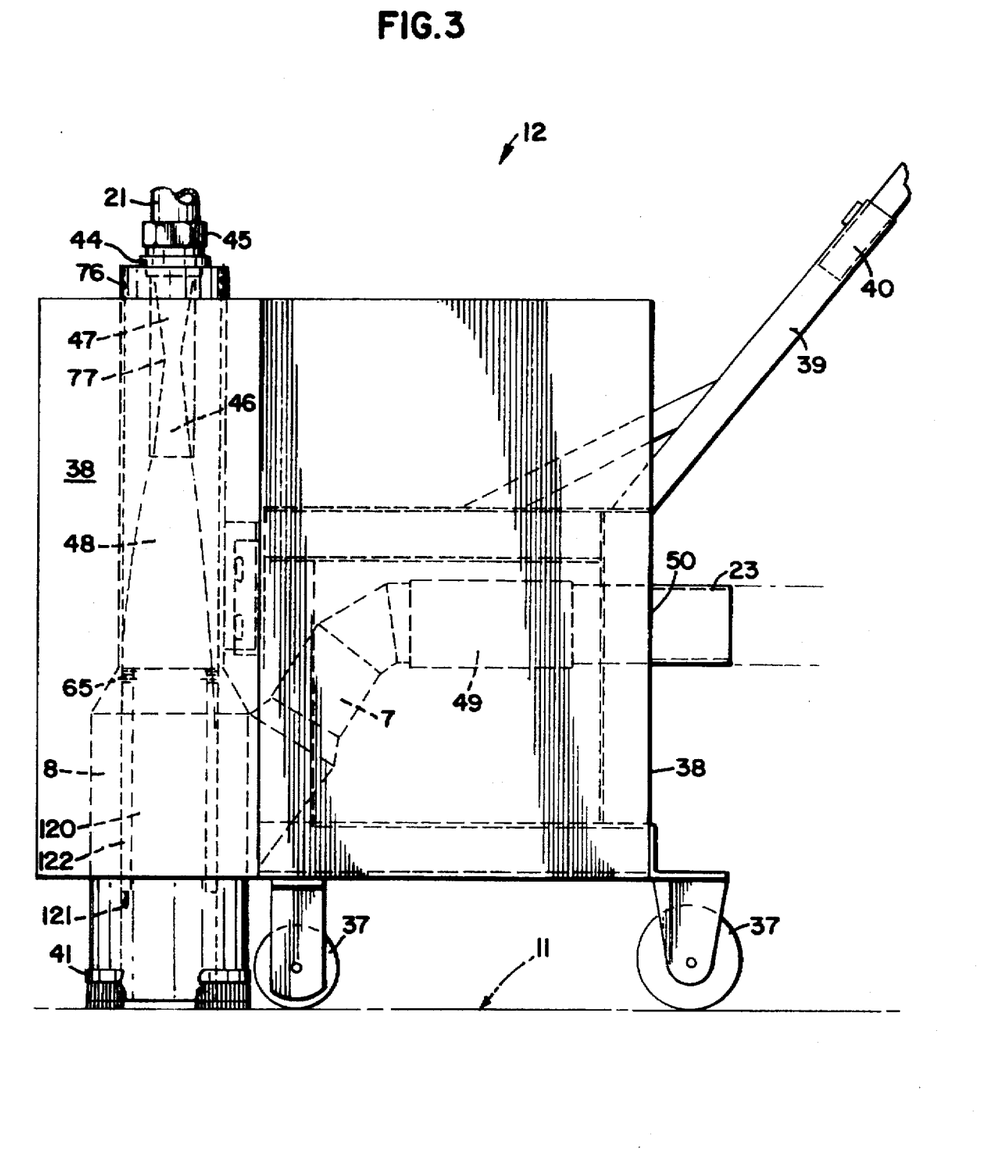
FIG. 3 is a side, schematic view of the system's cleaning head.

The media hose 21 attaches to an air inlet port 44 on the cleaning head 12 by means of a suitable connector 45. The inlet port 44 is in fluid communication with a bazooka nozzle 48 which extends downwardly toward the brush 41. Preferably, the nozzle 48 has an upper, converging bore portion 47 and a lower, diverging bore portion 46, with the narrowest opening being around section 77. The nozzle 48 is preferably screwed into place. When the air passes through the converging portion 47 of the bore, it is discharged at increased velocity, and the nozzle 48 thereby directs the particle stream toward the floor surface 11 at high velocity. Below the diverging bore 46 is another diverging portion 131 and a lower, cylindrical portion 120. Preferably, the bottom end 121 of the wear tube 122 is approximately four inches above the brush 41, and the distance between the top of the nozzle 48 and the brush 41 is approximately twenty-one inches.

In the preferred embodiment, the nozzle 48 has a cylindrical wear tube 122. The wear tube fits within the lower, cylindrical portion 121 of the nozzle 48. The wear tube 122 is preferably made of steel, but could be made of a high-strength polymer, carbide, or stainless steel. The tube 122 preferably has removable attachment means, such as threads 65 which mate with interior threads in the bore 46. Alternatively, the wear tube 122 could be connected with welding, a clamp, or a quick-connection mechanism.

The fluidized particles impinge the surface 11 to be abraded at high velocity. This abrasion effectively removes soil, grease, wax buildup, surface materials and a microscopic layer from the floor surface 11. (These components are simply referred to as "soils" below). The spent media particles and soils are then evacuated from the floor 11 into an annular channel 8, through an elbow 7, and into an exhaust chamber 49. Preferably, the exhaust hose is approximately ten inches above the brush 41. The exhaust chamber 49 has an outlet port 50 which is interconnected to an exhaust hose 23. Preferably, the exhaust hose 23 is approximately three to four inches in diameter and is made of flexible rubber. The exhaust hose 23 extends to the classifier or reclaiming tank 17.

The handle 39 of the cleaning head 12 has a control panel 51 with a pair of toggle switches (not shown). One toggle switch is for turning the cleaning head 12 on and off. The other toggle switch is for turning the transfer system on and off, as will be described below. The cleaning head's control panel 51 is electrically connected to the master control panel 16 by electrical circuitry 52.

The classifier 17 is illustrated in FIGS. 2 and 5. The classifier 17 separates the heavy media particulates from the lightweight, small particulate media and from the soils. The heavy particulates are suitable for reuse, and the other materials are suitable for disposal. Alternatively, the system 10 could have no classifier. That is, the media would not be recycled; it would simply be disposed of after one cycle.

In the preferred embodiment, the bottom portion 54 of the classifier 17 has a funnel-like shape. The reclaimed media accumulates in the bottom portion 54 of the classifier 17. Proximate the bottom of the funnel portion 54 is a constriction which is approximately 1½ inch in diameter.

The classifier 17 is mounted upon the cart 15. It has an inlet port 53 attached to the exhaust hose 23. The exhaust hose 23 terminates in a horizontal channel 84 within the classifier, which has an open end in the middle of the classifier's chamber. Proximate the open end of the channel 84 is a vertical channel 83. All material flows through the channel 83. The heavier material strikes the plate 61 and drops into the chamber 54, while the dust, soils and lighter media particles are pulled around plate 61 and into exit port 55, then out of the classifier 17 to the dust collector 57. The height of the vertical channel 83 in the classifier 17 is approximately twelve and one-half inches. This is the optimum height for best separation of the media to be reclaimed. A conduit 56 extends between the classifier 17 and the dust collector 57. The classifier 17 preferably has a glass sight gauge 58. The conduit 56 extends through a sleeve 59 which is mounted on top of the pressure tank 18.

The amount of particulate media which is recovered for re-use can be varied by adjustment of the classifier 17. The classifier 17 has a cylinder 60 at its upper end, below which is mounted a circular plate 61. The cylinder 60 on the classifier 17 is approximately six inches tall and approximately six inches in diameter. The plate 61 is preferably circular in shape and approximately six inches in diameter. The plate 61 is preferably mounted with a nut and bolt arrangement, so that the vertical position of the plate 61 can be adjusted. Other suitable attachment mechanisms could be easily devised. Preferably, the space between the plate 61 and the bottom of the cylinder 60 is approximately one inch. Raising the plate 61 (and therefore decreasing the distance between the plate and the cylinder's top surface) reduces the size of the classifier's upper opening and reduces the vacuum pressure, therefore resulting in a reduction in the amount of particulate material which is delivered to the dust collector 57.

Figure 7:
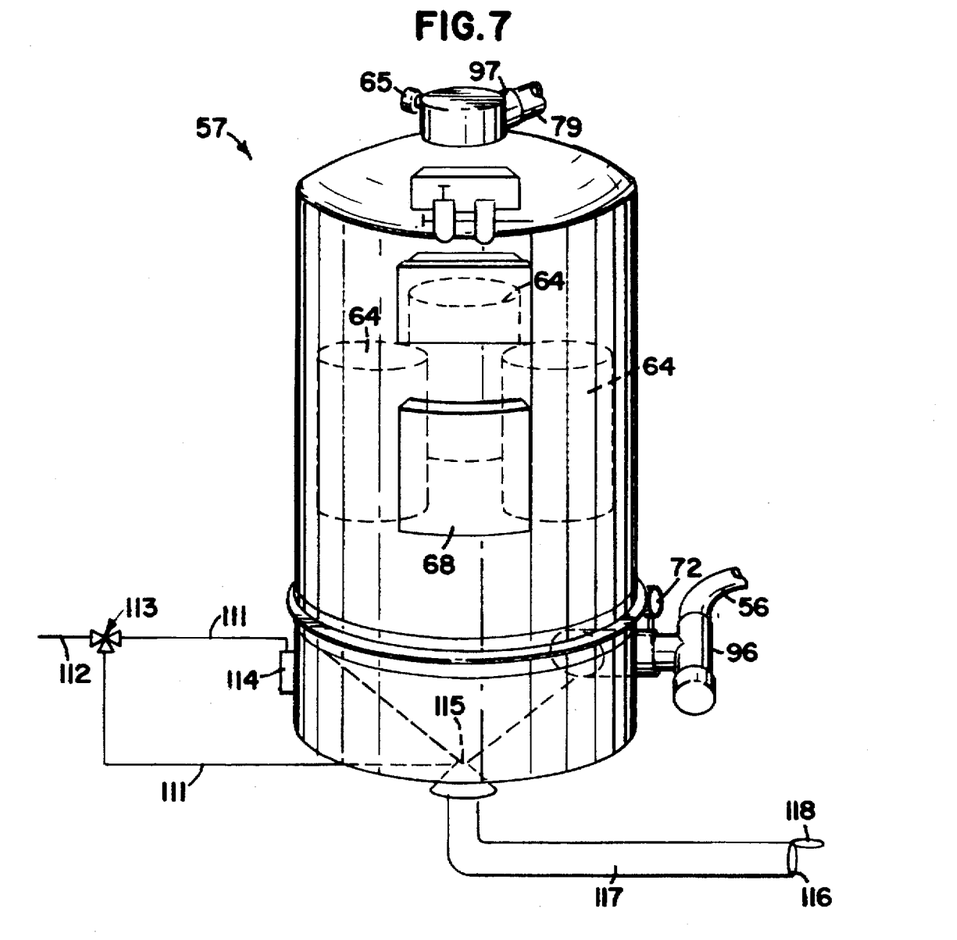
FIG. 7 is a side, schematic view of the dust collector.

The dust collector 57 is illustrated in FIGS. 2 and 7. Within the dust collector 57, the fluidized materials pass through the filters 64; and the soils, surface materials, and lightweight particulate matter are deposited upon the filters. The dust collector 57 has a vacuum rating of ten inches of mercury (column). The dust collector 57 preferably has three cartridges 64, each cartridge 64 being a cylindrical, pleated air filter. Each cartridge 64 has several filter elements: a coalescer element for oil removal, an interceptor element for particulate removal, and an absorber element for odor remover. In the preferred embodiment, each filter 64 is approximately 26 inches in height and thirteen inches in diameter, although the filters 64 could have many different configurations. There is an access door 68 in the wall of the dust collector 57 to facilitate replacement of the filters 64.

The upper portion of the dust collector 57 has three air valves, one valve being positioned above each cartridge 64. The values (not shown) deliver air downwardly through the filters 64 in intervals so as to clean out the filters 64. This provides an automatic, pulse jet cleaning mechanism for the dust collector 57.

Near the lower end of the dust collector 57 is a tee 96 which receives exhaust line 56. Operatively connected to the tee 96 is a vacuum gauge 72. At the top of the dust collector 57, the filtered air leaves through an exit port 97 and passes into the conduit 79, which is preferably four inches in diameter. The conduit 79 extends to the vacuum pump 22. The exit port 97 has a vacuum relief valve 65. At the bottom of the dust collector 57 is a funnel for directing the soils to the bottom of the dust collector 57 for emptying. The soils are expelled through a chute 117 and opening 116 controlled by a flapper valve 118. The bottom portion of the dust collector 57 has a vibrator 114 to facilitate downward movement of the soils. The funnel terminates in an air sluice connection 115, which injects air to expel the soils. The air sluice connection 115 is in fluid communication with air tubing 111 and a three-position valve 113. The "up" position of the valve 113 activates the vibrator 114, the "middle" position is off, and the "down" position activates the air to the discharge chute 117. The air supply tube 112 provides air for injection through the air sluice connection 115. A manual air switch (not shown) controls the three-way the valve 113. An electrical panel 98 is electrically connected to the aftercooler 26 by circuitry 99.

Figure 6:
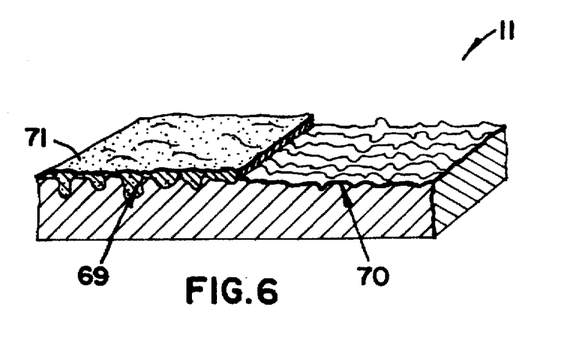
FIG. 6 is a perspective view of untreated floor tile and floor tile which has been treated with the restoration system of the present invention.

As illustrated in FIG. 6, the restoration process of the present invention removes the top layer 71 and exposes the floor's pores to the surface 70. The schematic view of FIG. 6 is exaggerated for clarity; the present invention removes approximately two to three thousandths of an inch from the floor 11. The floor's pores are shallowed, which makes cleaning and drying more efficient and effective. The soils, grease, excess cleaning material, dust, etc., designated in FIG. 6 as 69, are also removed. The right side of FIG. 6 illustrates the composition of the floor 11 after the restoration process of the present invention. The surface 70 of the floor has small peaks and valleys which are free from soil. The floor surface 70 provides excellent slip resistance. Besides providing a clean and slip-resistant floor surface, the present invention may also be used to etch a floor surface to provide a bonding tooth for a subsequent surface coating.

The preferred media consists of garnet particles, which is an aluminosilicate mineral. The preferred size range of the garnet particles is 0.1 to 0.8 mm. Alternative types of suitable media include silicon carbide, silica sand, and any other suitable homogeneous, inert minerals. Somewhat softer suitable types of media include walnut shells, corn cobs, baking soda, glass beads, plastic beads, and copper slags. The size and hardness of the media is selected to match the hardness of the surface to be treated and the goal of the treatment. For example, if the goal is to clean the floor, then a relatively soft grit would be selected. If the goal is to significantly increase the floor's coefficient of friction, then a relatively small, hard type of media would be selected. If the surface being treated is thin such as a pan) or soft (such as asphalt) then a relatively soft media material would be used.

The vacuum blower 22 is belt driven by the power-takeoff shaft of the truck 19. The compressor 20 and the vacuum blower 22 are interconnected, so that increased air pressure provided by the compressor 20 automatically results in an increased vacuum in the vacuum blower 22. Depending upon the type of floor surface 11, the type of media, and the amount of soil, the air pressure may be adjusted in the 30-80 psig range.

As the system 10 is run, the pressure tank's supply of media will become depleted, and the classifier 17 will have an accumulation of media in its lower chamber 54. When this occurs, the present invention features a system for automatically transferring the media from the classifier 17 to the pressure tank 18. This is accomplished by forcing the particulates through a transfer conduit 86 and into the pressure tank 18. This transfer system allows approximately 300 pounds of material to be transported into the pressure tank 18 in approximately 40 seconds. Periodically as the system 10 is used to restore the floor 11, the operator can replenish the abrasive particles in the pressure tank 18 by using the transfer system.

The transfer line 86 (illustrated in FIGS. 2 and 5) is preferably four inches in diameter. The transfer line 86 extends between a bottom portion 54 of the classifier 17 to the top of the pressure tank 18. Near the top of the classifier 17, a plunger valve 100 is closed to prevent media from entering the exhaust conduit 56. In the pressure tank 18, the pressure relief valve 90 on the top of the pressure tank 18 is opened to equalize the pressure, allowing the plunger 130 to drop and media to flow into chamber 33 of tank 18. The plunger valve 35 in the pressure tank 18 is opened by movement of the valve plunger 130 downwardly, thereby allowing the downward flow of media. (The plunger valve 35 is shown in its open position in FIG. 2). Before the transfer operation begins, the on-off switch for controlling operation of the cleaning head 12 is turned to the "off" position. Each of the transfer system valves is electrically interconnected to the control panel on the cleaning head's handle 39 via circuitry 52 and the main control panel 16. A toggle switch on the cleaning head's handle control panel is moved to turn the transfer system on or off.

The restoration process of the present invention is only one step in an ongoing floor maintenance program. Preferably, the quarry tile floor is restored with the invention's system every one to three years. Routine daily cleaning with proper floor cleaning procedures and chemicals (the preferred routine being to sweep, apply detergent, deck brush, and rinse) are required to maintain the optimum coefficient of friction.

Although the present invention has been described for restoration of a floor, specifically a quarry tile floor, the present invention could be used for many other types of surfaces. For example, the present invention may be utilized on concrete (pool decks, buildings, roadways, walkways, etc.); stainless steel (storage tanks, hood and ducts, etc.); asphalt (driveways, roads, etc.); and other surfaces and applications. The system may be used to remove rust, provide a thorough cleaning, and/or increase the surface's coefficient of friction. Because the invention is a closed system which contains the stream of particles, the invention may be utilized both indoors and outdoors.

The operation of the cleaning and restoration system 10 will now be described. The truck 19 is positioned close to the work site. If the work site is more than 50 feet from the truck's bed, then the cart 15 containing the classifier 17, pressure tank 18 and control panel 16 is moved closer to the job site. If, however, the truck is within 50 feet of the job site, the cart 15 and its equipment can simply remain in the truck bed. In the preferred embodiment, a crane 109 on the truck bed assists with the raising and lowering of the cart 15. A power switch (not shown) for the crane is located in the truck's cab. The cleaning head 12 is positioned upon the surface 11 to be treated. The main pressure valve (on the outlet side of the aftercooler 26) is opened, and the drain valve on the water separator 27 is also opened.

The pressure tank 18 is loaded with the particulate media from the storage tanks 105. An appropriate type and size of media is selected, depending upon the type of surface being treated and the goal of the treatment. For floor areas under approximately 1,000 square feet, approximately 300 pounds of media should be charged in the pressure tank 18. The main air supply ball valve (not shown) and the release valve (not shown) of the coalescing filter are both opened. The main air supply ball valve is located under the control panel 16. The vibrator 37 on the pressure tank 18 is engaged, and the media metering valve 43 is adjusted to the desired setting.

The exhaust conduit 23 from the cleaning head to the classifier and the exhaust conduit 56 from the classifier 17 to the dust collector 57 are connected, with the length of the conduit 56 depending upon the distance between the classifier on its cart 15 and the dust collector in the truck 19. Preferably, the conduits 23 and 56 are stored on a reel 107 which is movable on a track to a position outside the side wall of the truck bed.

The dust collector 57 and aftercooler 26 require a 110 volt power source. This electrical connection is made from the job site's "house" outlet with an extension cord.

Before the system 10 is activated, the rear and side doors of the truck trailer are closed to reduce noise. The truck 19 is started, with the emergency brake on and the truck out of gear. A power cord extending between the cleaning head 12 and control panel 16 is attached so that the control panel's battery can power the switches on the cleaning head 12. To start the system, the truck's engine is started and the operator turns the key switch to the "start" position. The vacuum blower 22 is started by engaging the power takeoff clutch via a belt 76 and activating a vacuum blower knob in the truck's cab. The compressor 20 is also started by engaging the power takeoff and activating a compressor knob (not shown) in the truck's cab.

The media metering valve 43 at the bottom of the pressure tank 18 is manually adjusted to regulate the amount of abrasive particles which are entrained in the air stream and delivered to the cleaning unit 12. The valve's setting may need to be adjusted throughout the cleaning process of the floor 11, because the withdrawal of grease, debris and moisture from the floor 11 may affect the flow rate of the particulate media. Additionally, the air pressure may need to be increased or decreased in the 40–60 psig range.

The cleaning unit 12 is turned on with the "on/off" switch on the cleaning head's control panel. This activates the vacuum recovery system and begins movement of the particulate media to the floor area 11. The cleaning head 12 is moved slowly back and forth across the floor surface 11 to give the level of cleansing and restoration desired. The treated floor 11 will have a slightly dull appearance free of grease, oils and debris. The treated floor 11 will exhibit an increased coefficient of friction. The cleaning head 12 should not be allowed to remain in one area too long or move too slowly, because excessive erosion of the floor 11 may occur.

As the media is transferred from the pressure tank 18 and vacuumed up, it is accumulated in the classifier tank 17. Periodically, the media can be transferred back to the pressure tank 18 by switching the "media transfer switch" on the cleaning head's control panel to the "on" position. After the transfer process is completed, this switch is turned off, so that floor treatment can be resumed.

If a large floor area 11 is being treated, for example in excess of 1500 square feet, the operator may need to add additional particulate media to the pressure tank 18, due to the loss of some particulate media in the vacuum recovery system. After about three transfer sequences, there is an insignificant amount of recyclable media remaining. Large floor areas may also require draining of the particulate media and the substitution of new media if the media becomes heavily laden with grease, oil and/or moisture. This is evident by the inability of the media to flow out of the pressure tank 18 smoothly at the valve outlet 43. The pressure tank outlet valve 43 may need to be adjusted periodically throughout the cleaning run in order to maintain good media flow.

In order to shut down the system, the switch on the cleaning head 12 is turned to its "off" position. To stop the vacuum blower 22 and compressor 20, the PTO clutch is disengaged. The vacuum pump 22 is disengaged by pushing in the clutch and depressing the vacuum pump engagement knob (not shown). The clutch is released, and the compressor is allowed to continue running long enough to clean the dust collector filters 64. The chute cover 118 of the dust collector 57 is opened, and a dust bag is placed over the end of the chute 117. The three-position air valve 113 is activated to engage the dust collector's vibrator 114, and then to supply air to the discharge chute 117. This process is repeated until the dust collector 57 is empty. The cleaning head 12 and cart 15 are returned to the truck 19.

Any loose media upon the floor 11 is swept up and disposed of. The treated floor 11 is then rinsed to remove any residual dust or material left on the floor. The classifier 17 is drained by transferring media into the pressure tank 18. The pressure tank 18 and dust collector are then drained of media and soils, which are disposed of.

Experimental Section

X-ray microanalysis tests were conducted to determine the elements present in quarry tile. A new, untreated quarry tile was tested, as well as quarry tile treated by an acid etch process and a quarry tile treated with the cleaning and restoration process of the present invention. The first three columns show the composition of the tile's surface, whereas the right-hand column shows the composition of the core of a new, untreated tile. The type of quarry tile tested is sold by the American Olean Co. under the trademark Canyon Red™. The acid etch product was of the type manufactured by the Economics in Technology/Carroll Co. of Costa Mesa, Calif. under the Ultra Traxion™ trademark. The below figures show the percent by weight of each element. The figures have been rounded off, resulting in slight variations from 100 percent. The elemental analysis results are shown in Table I.

TABLE I

| | ELEMENTAL ANALYSIS | | | |
|---|---|---|---|---|
| Element | Untreated Tile | Acid Etched Tile | Restored Tile | Core |
| Silicon | 51 | 39 | 51 | 51 |
| Aluminum | 32 | 29 | 22 | 23 |
| Sodium | 6 | — | 2 | 2 |
| Potassium | 5 | 3 | 6 | 7 |
| Manganese | 4 | 3 | 3 | 2 |
| Calcium | 2 | 4 | 2 | 2 |
| Iron | 1 | 20 | 12 | 12 |
| Titanium | — | 2 | 1 | 1 |
| | 101 | 100 | 99 | 100 |

(The above percentages do not include oxygen).

These data show that the acid etch treatment significantly reduces the amount of hard particles (silicon) in the quarry tile, by reducing them from 51% to 39% of the tiles composition. In contrast, the restoration system of the present invention maintains the amount of hard particles at about 50%, thereby maintaining the integrity and durability of the tile surface. The tile treated with the restoration system exhibited an elemental composition substantially the same as the core of new, untreated quarry tile. Therefore, the restoration system does not appear to reduce the life expectancy of the tile.

We have found that the aluminum content of the surface of untreated tile floors ranges from about 19 wt % to about 32 wt % while the tile core has an aluminum content of about 17 wt % to about 25 wt %. The silicon content of the tile floors ranges from about 50 to about 59 wt % at the surface of an untreated tile floor to about 51 to about 66 wt % at the core.

The coefficient of friction (COF) measures how well a shoe resists slipping on a floor. A high number is slip resistant; a low number is slippery. Although there is no current ANSI (American National Standard Institute) requirement, a minimum coefficient of friction of 0.50 (wet and dry) is a recognized industry standard for a slip resistant flooring surface. The Ceramic Tile Institute and the National Bureau of Standards consider coefficient of friction values in excess of 0.60 as safe values, from 0.50 to 0.60 as marginally or conditionally safe, and values below 0.50 as slippery. New tile typically has a COF of 0.8–0.9 when clean and dry; 0.4–0.5 when wet; and 0.2–0.3 when soiled and wet. Old tile typically has a COF of 0.5–0.6 when clean and dry; 0.2–0.3 when wet; and 0.1 when soiled and wet.

Experiments where conducted to measure the slip resistance or coefficient of friction (COF) of tile floors. The COF was measured by using a Brungraber Mark II™ slip tester machine. Measurements were taken of new quarry tile, old untreated quarry tile, and old quarry tile which had been treated with the abrasion system of the present invention. The "new" tile was in use in a restaurant setting, but had been installed only months before the testing. Measurements were taken under the following floor conditions: 1) clean and dry, 2) wet, and 3) soiled and wet. The COF measurements are summarized in Table II.

TABLE II

COEFFICIENT OF FRICTION

|  | New Tile | Old, Untreated Tile | Old, Treated Tile |
| --- | --- | --- | --- |
| Clean/Dry | 0.8–0.9 | 0.4–0.6 | 0.8–0.9 |
| Wet | 0.4–0.5 | 0.2–0.3 | 0.5–0.6 |
| Soiled/Wet | 0.2–0.3 | 0.1 | 0.3–0.4 |

These data show that the present invention produces a floor surface that is comparable to new quarry tile when the floor is clean and dry. When the floor is wet, or soiled and wet, the system of the present invention actually increases the COF and traction of the floor as compared to a new tile.

As noted above, it is possible to use different types and sizes of media in order to achieve the desired floor surface which is cleaner and/or has increased traction. Experiments were conducted to measure the coefficient of friction of quarry tile floors with respect to the effect of varying air pressures and varying sizes of the media. Measurements were taken of brand new, unused, dry tile which had been treated with the restoration system of the present invention, as well as brand new tile which had been subjected to a coating of oil and water after treatment by the restoration system. These respective COF measurements are summarized in Tables III and IV respectively. The type of media utilized for these experiments was garnet.

TABLE III

EFFECT OF GRIT SIZE AND PRESSURE ON COEFFICIENT OF FRICTION (DRY FLOOR)

| | | Pressure (psi) | | | |
| --- | --- | --- | --- | --- | --- |
| | | 40 | 50 | 60 | 70 |
| Grit | 0.5–0.65 | 0.92 | 0.94 | 0.95 | 0.94 |
| Size | 0.32–0.38 | 0.93 | 0.95 | 1 | 1 |
| (mm) | 0.18–0.24 | 0.96 | 0.95 | 0.96 | 1.01 |

TABLE IV

EFFECT OF GRIT SIZE AND PRESSURE ON COEFFICIENT OF FRICTION (WET AND OILY FLOOR)

| | | Pressure (psi) | | | |
| --- | --- | --- | --- | --- | --- |
| | | 40 | 50 | 60 | 70 |
| Grit | 0.5–0.65 | 0.27 | 0.32 | 0.37 | 0.31 |
| Size | 0.32–0.38 | 0.37 | 0.41 | 0.45 | 0.46 |
| (mm) | 0.18–0.24 | 0.34 | 0.37 | 0.43 | 0.46 |

These data show that, generally, increased air pressure results in an increased coefficient of friction and a smaller-sized media also increases the coefficient of friction and traction of the floor.

It is to be understood that numerous and various modifications can be readily devised in accordance with the principles of the present invention by those skilled in the art without departing from the spirit and scope of the present invention. Therefore, it is not desired to restrict the invention to the particular constructions illustrated and described, but to cover all modifications that can fall within the scope of the appended claims.

What is claimed is:

1. A system for cleaning a floor and/or restoring the slip resistance of a floor, the floor having soils and surface particles, the system comprising:
    a) compressor means for supplying an air stream, said air stream being adjustable to a desired level of air pressure, said compressor means being in fluid communication with an air supply conduit;
    b) moisture reduction means in fluid communication with said air supply conduit, wherein said moisture reduction means reduces the moisture in the air stream;
    c) entrainment means for entraining media particulates into the air stream, said entrainment means being adjustable so that the amount of media particulates entrained can be varied, said entrainment means being in fluid communication with said air supply conduit, wherein the amount of particulars entrained increases as said level of air pressure increases, further comprising a media tank which stores said media particulates before entrainment in the air stream;
    d) abrasion means for impinging the media particulates upon the floor for the removal of soils and surface particles, said abrasion means being movable across the floor in any direction, said abrasion means including an annular brush having a plurality of bristles which touch the floor, said abrasion means including an exhaust chamber in fluid communication with an exhaust conduit, wherein said abrasion means comprises:
        i) a support frame including a plurality of wheels, said support frame including a handle;

ii) a nozzle having a longitudinal bore, said nozzle having an upper end and a lower end, said upper end being in fluid communication with said air supply conduit, said upper end including a converging portion and a diverging portion, said lower end of said bore being above the floor; and iii) an exhaust chamber in fluid communication with said bore and with an exhaust conduit, said exhaust conduit being in fluid communication with classifier means for recycling a portion of the media particulates;

e) vacuum means in fluid communication with said exhaust conduit for the evacuation of substantially all of the soils and surface particles from the floor, wherein said vacuum means automatically adjusts to said level of said air stream of said compressor;

f) classifier means for separating the media particulates from the soils and surface particles, said classifier means being in fluid communication with said exhaust conduit and said vacuum means, further comprising a transfer means for transferring the heavy particulates in the classifier means to said media tank; and g) filter means for filtering the soils and surface particles, said filter means being in fluid communication with said classifier means, wherein said system etches the floor and increases the coefficient of friction of the floor.

2. The system of claim 1, further comprising a wear tube positioned within said lower portion of said abrasion means, said wear tube being releasably connected to said abrasion means.

3. The system of claim 1, wherein said media particulates are selected according to the material from which the floor is made.

4. The system of claim 3, wherein said media particulates comprise garnet.

5. The system of claim 3, wherein said media particulates are approximately 0.1 to 0.8 mm in size.

6. The system of claim 5, wherein relatively small and hard media particulates are selected for a floor which is relatively hard.

7. A system for cleaning a quarry tile floor and restoring the slip resistance of a floor, the floor being made of relatively soft and hard components, the floor having soils and surface particles, the system comprising:

a) compressor means for supplying an adjustable air stream to an air supply conduit;

b) moisture reduction means in fluid communication with said air supply conduit;

c) adjustable entrainment means for entraining an effective amount of media into the air system, said media including garnet particles, wherein said media impinges upon the floor to dislodge the soils and surface particles and to mechanically remove the relatively soft components of the tile;

d) a portable abrasion machine movable the floor in any direction, said abrasion machine including:

i) a support frame including a plurality of wheels, said support frame including a handle;

ii) a nozzle having a longitudinal, vertical bore, said nozzle having an upper end and a lower end, said upper end being in fluid communication with said air supply conduit, said lower end being above the floor;

iii) a wear tube releasably attached to said lower end of said nozzle; and iv) an exhaust chamber proximate said nozzle and said floor, said exhaust chamber being in fluid communication with an exhaust conduit;

e) vacuum means in fluid communication with said exhaust conduit for the evacuation of substantially all of the soils and surface particles from the floor, wherein said vacuum means automatically adjusts to said level of said air stream of said compressor;

f) fluidized classifier means for separating the media from the soils and surface particles, said classifier means being adjustable so as to control the amount of media to be reused; and g) dust collector means for filtering the soils and surface particles, said dust collector means being in fluid communication with said classifier means.

8. The system according to claim 7, further comprising a truck having a power takeoff shaft, wherein said compressor means is powered by said truck takeoff shaft.

9. The system according to claim 8, wherein said dust collector includes a plurality of cylindrical air filters.

10. The system according to claim 9, wherein said dust collector includes pulse jet cleaning means.

11. The system according to claim 9, wherein said dust collector includes a vibrator.

12. The system according to claim 8, wherein said vacuum means is powered by said truck takeoff shaft.

13. The system of claim 7, wherein said media is approximately 0.1 to 0.8 mm in size.

* * * * *